(12) United States Patent
Sergiy

(10) Patent No.: US 6,622,965 B1
(45) Date of Patent: Sep. 23, 2003

(54) AIRCRAFT LUGGAGE RACK

(75) Inventor: Korenets Sergiy, Kharkiv (UA)

(73) Assignee: InterAMI Ltd., Kharkiv (UA)

( * ) Notice: Subject to any disclaimer, the term of this patent is extended or adjusted under 35 U.S.C. 154(b) by 0 days.

(21) Appl. No.: 10/148,135

(22) PCT Filed: Aug. 17, 2000

(86) PCT No.: PCT/US00/00031

§ 371 (c)(1),
(2), (4) Date: May 28, 2002

(87) PCT Pub. No.: WO01/45983

PCT Pub. Date: Jun. 28, 2001

(30) Foreign Application Priority Data

Dec. 20, 1999 (UA) .......................... 99126920

(51) Int. Cl.[7] .............................................. B64D 47/00
(52) U.S. Cl. ................................................. 244/118.1
(58) Field of Search ..................... 244/118.1, 118.2, 244/129.4; 312/245–248; D6/632, 396, 397; D7/609

(56) References Cited

U.S. PATENT DOCUMENTS

| | | | | |
|---|---|---|---|---|
| 2,736,452 A | * | 2/1956 | Roop | 220/252 |
| 3,700,199 A | * | 10/1972 | Matuska | 244/118.1 |
| 4,166,530 A | * | 9/1979 | Robinson | 206/315.9 |
| 4,596,416 A | | 6/1986 | Muller | |
| 4,907,762 A | * | 3/1990 | Bock et al. | 244/118.1 |
| 5,090,640 A | | 2/1992 | Fessett | |
| 5,108,048 A | | 4/1992 | Chang | |
| 5,129,597 A | * | 7/1992 | Manthey et al. | 244/118.5 |
| 5,383,628 A | * | 1/1995 | Harriehausen et al. | 244/118.1 |
| 5,441,218 A | * | 8/1995 | Mueller et al. | 244/118.1 |
| 5,567,028 A | * | 10/1996 | Lutovsky et al. | 312/246 |
| 5,803,563 A | * | 9/1998 | Woodward | 160/37 |
| 5,934,615 A | * | 8/1999 | Treichler et al. | 244/118.5 |
| 6,045,204 A | * | 4/2000 | Frazier et al. | 16/370 |
| 6,290,175 B1 | * | 9/2001 | Hart et al. | 244/118.1 |
| 6,398,163 B1 | * | 6/2002 | Welch et al. | 244/118.1 |

FOREIGN PATENT DOCUMENTS

| | | | |
|---|---|---|---|
| DE | 3741164 | 7/1989 | |
| DE | 4018362 A1 | * 12/1991 | ........... B64D/11/00 |
| FR | 2632907 | 12/1989 | |
| WO | 9098320 | 8/1990 | |

* cited by examiner

*Primary Examiner*—Peter M. Poon
*Assistant Examiner*—Susan Piascik
(74) *Attorney, Agent, or Firm*—Elliott N. Kramsky

(57) ABSTRACT

An aircraft luggage rack consists of limiting walls with dividers and a cover and a cover opening mechanism which contains a gas compensator and an arm, both being fixed with the aid of a hinge pin at one end to the divider and to the luggage rack cover with aid of a bracket at the other. A roller is fixed to the arm in such a way that it could move along profiled guides made in the divider. At the top of the rack there are casings in which the cover is arranged in an extreme top position. The device ensures the possibility of simultaneous opening of two opposite luggage racks and better lighting of both, the aircraft cabin and the luggage rack interior.

2 Claims, 2 Drawing Sheets

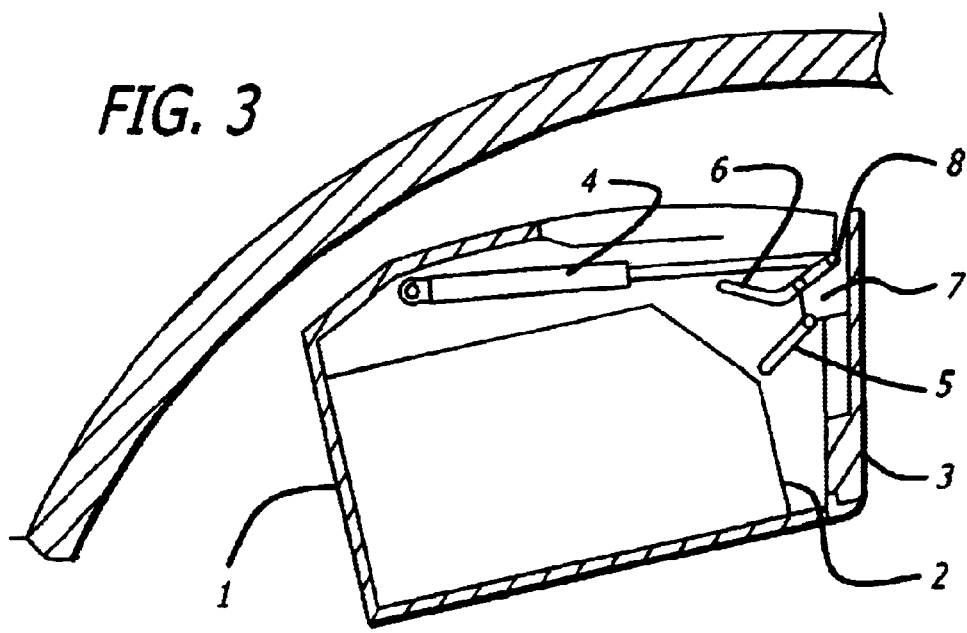
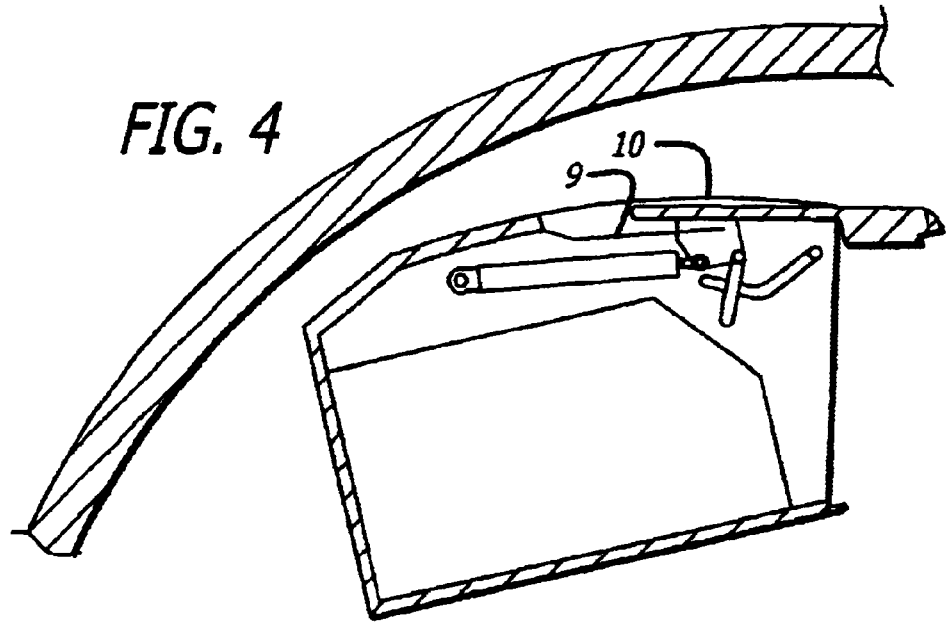

AIRCRAFT LUGGAGE RACK

THE FIELD OF THE INVENTION

The invention relates to aircraft engineering and transport engineering, particularly to the equipment of the aircraft for carrying cargoes. The invention can be used for the transportation of goods and also for arranging passenger hand luggage in an aircraft cabin.

BACKGROUND OF THE INVENTION

It is known the support panel system (U.S. Pat. No. 5,108,048, IPC B64D 11/00, B64C 1/22, publ. 28.04.92) comprises a cargo container, a stopper device and a bracket.

A disadvantage of this device is inconvenience in exploitation thereof, because mobile parts block up considerable portion of space during opening of the container cover.

An air-cargo transport device (USSR Inventors Certificate No.1799337, IPC B64D 9/00, publ. 28.02.93) is known. It comprises a baggage compartment with hatches. The baggage compartment is manufactured as a module with sectional containers, wherein the each section is made up as a separate chamber with a door.

A disadvantage of this device is inconvenience in exploitation thereof, because mobile parts block up considerable portion of space during opening of the container cover.

It is known a baggage compartment of a car (USSR Inventors Certificate No. 1043053, IPC B60R 7/02, publ. 20.09.93), which is formed by the car bottom shield, and its side and back walls.

There is a high probability of injuring by a baggage compartment cover in this device, while opening, because of positioning thereof on the level of the user's head.

The closest to the invention by technical essence, objective and achieved result is an aircraft cabin luggage rack (U.S. Pat. No. 5090640, IPC B64D 25/14, B64C 47/00, publ. 25.02.92). It comprises limiting walls, a cover and a cover opening mechanism.

The disadvantages of this device are as follows:
- the device is inconvenient in use because while opening the cover makes a curve, which limits a substantial portion of a cabin space, and therefore makes unavailable simultaneous opening of two opposite luggage racks;
- the device exploitation could be dangerous, because cover opening mechanism having a spring, which could be a source of uncontrolled abrupt opening of the cover, and might injure passengers;
- the device is inconvenient in use because in the top extreme position the cover shades a lamp arranged between the luggage rack and the ceiling, and therefore shadows both, the aircraft cabin and the luggage rack interior.

The above-identified disadvantages of the prior art lead to inconvenience of its exploitation, and shows that the rack is the source of a danger and low level of lighting in the cabin.

The objective of the invention is to better the existing conditions of the device exploitation by arranging the cover in its top extreme position inside the rack, thereby ensures the possibility of simultaneous opening of two opposite luggage racks.

Another objective is to increase the safety of exploitation due to the fact, that the cover opening mechanism ensures smooth opening, and therefore excludes the probability of passengers injury.

Furthermore, objective of the invention is to increase the level of lighting of the rack compartment and the cabin, due to the fact, that the cover in its open position is arranged inside the rack compartment, and therefore does not shadow the lamp.

DESCRIPTION OF THE INVENTION

These objectives are solved in that the aircraft luggage rack comprises limiting walls with dividers, cover and cover opening mechanism, wherein according to the invention the cover opening mechanism contains a gas compensator and an arm, both being fixed with the aid of a hinge pin at one end to the divider and to the luggage rack cover with aid of a bracket at the other. A roller is fixed to the arm in such a way that it could move along profiled guides made in the divider. At the top of the rack there are casings in which the cover is arranged in an extreme top position.

The device ensures the better conditions of exploitation due to the fact, that when opening the rack, the gas compensator begins to compress and enforce to remove the cover, which makes rotary-onward/downward motion and is arranged at the top of the rack between the internal and external casings.

The device provides a better safety of the rack exploitation due to the cover is moved along profiled guides, thereby providing smooth opening of the rack.

The device also helps to avoid shadowing of the aircraft cabin and the luggage rack interior, because the cover opening mechanism enforces the cover to move inside the luggage rack while opening the rack.

SHORT DESCRIPTION OF DRAWINGS

FIG. 3 shows cross-section of the shelf in the closed position;

FIG. 4 shows the cross-section of the shelf in the open position.

Figure 1:
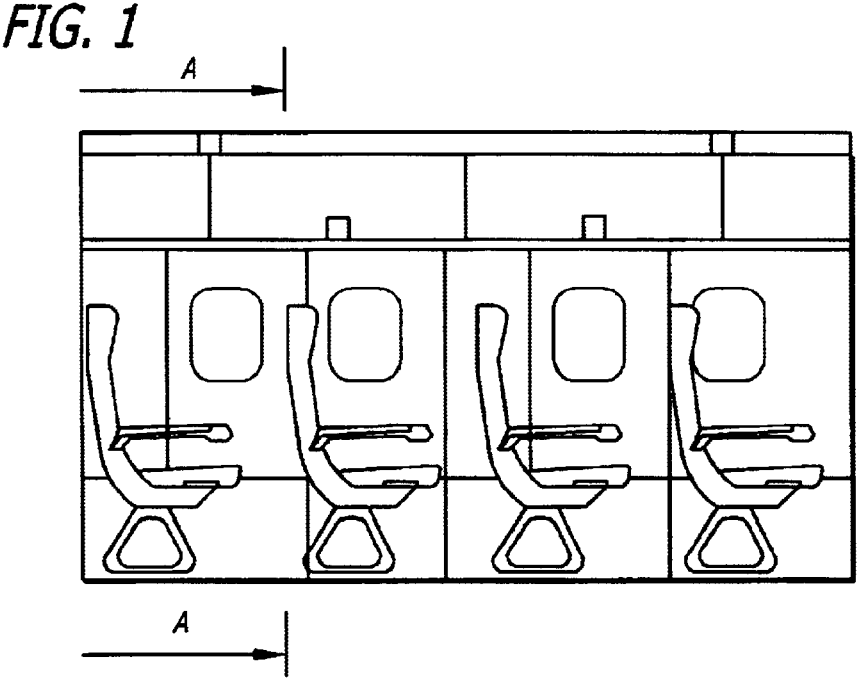
FIG. 1 shows a general view of the luggage rack in the aircraft cabin.
Figure 2:
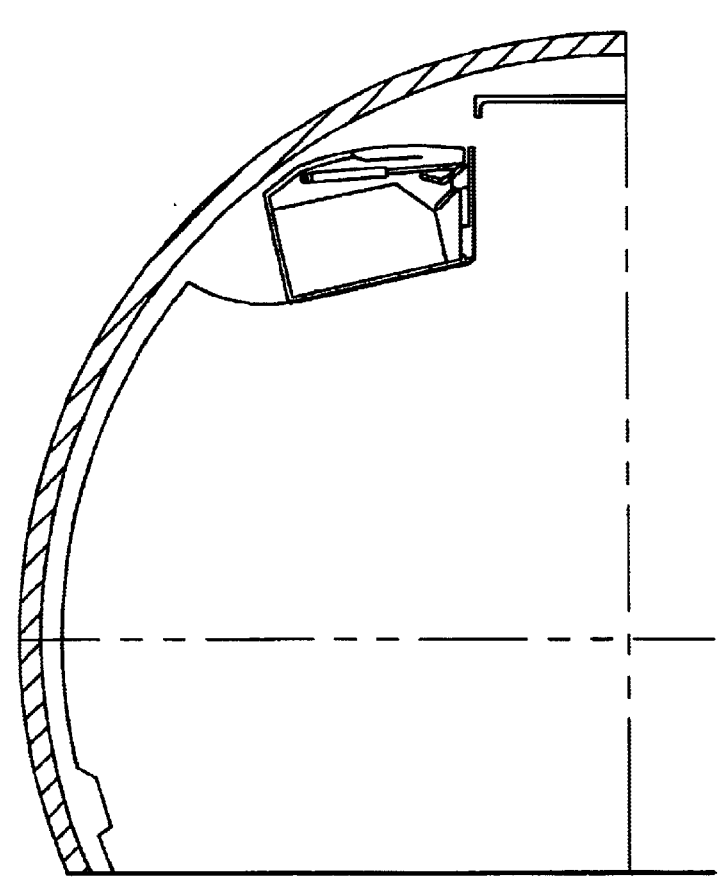
FIG. 2 shows cross-section A—A.

The aircraft luggage rack contains limiting walls 1, dividers 2, cover 3 and cover opening mechanism, consisting of a gas compensator 4 and an arm 5, both being fixed with the aid of a hinge pin to the divider 2. The divider 2 are provided with profiled guides 6. The other end of the gas compensator 4 and the arm 5 are connected with the aid of a hinge pin to the bracket 7, which is fixed on the cover 3. The bracket 7 is provided with a roller 8, which is moveable in the guides 6. In the open position the cover 3 is arranged at the top of the rack between internal 9 and external 10 casings.

In the closed position the cover 3 is arranged at the lower position. The gas compensator 4 is in the stretched position.

The device works in the following manner. When opening the rack, the gas compensator 4 begins to compress and enforce to remove the cover 3 by means of the bracket 7.

Under the forces, which occurred both between the roller 8 and the guides 6, and between the bracket 7 and the arm 5, the cover 3 makes a rotary upward/downward motion and is arranged at the top of the rack between the internal 9 and external 10 casings.

INDUSTRIAL APPLICATION

The proposed device is industrially applicable and could be used in aviation as the equipment of an aircraft for carrying cargoes as well as in other transport means for carrying luggage.

THE PREFERRED EMBODIMENT

The best application of the device is inside the aircraft cabin to locate passenger hand luggage.

In this case the claimed invention could increase security and convenient exploitation, particularly, ensures the possibility of simultaneous smooth opening of two opposite luggage racks of the aircraft cabin without probability of injuring passengers by the shelves' covers. It also provides better lighting of both, the aircraft cabin and the luggage rack interior.

What is claimed is:

1. An individual aircraft luggage rack comprises back, lower and upper limiting walls, side dividers, a cover and a cover opening mechanism, characterized in that the side divider includes a cover opening mechanism comprising a gas compensator and an arm, each fixed, with the aid of a hinge pin, at one end to a side divider and, at the other end, to a bracket fixed to the luggage rack cover, said bracket including a roller installed capable of moving along profiled guides in the side divider, and wherein the upper limiting wall includes a casing separating an interior portion of the rack in which at least a part of the cover can being arranged in the completely open position.

2. An individual aircraft luggage rack as defined in claim 1, wherein the profiled guides as a whole have a V-configuration.

* * * * *